United States Patent [19]

Garman

[11] Patent Number: 4,955,685
[45] Date of Patent: Sep. 11, 1990

[54] ACTIVE FIBER FOR OPTICAL SIGNAL TRANSMISSION

[75] Inventor: Jonathan D. Garman; Los Altos, Calif.

[73] Assignee: Sun Microsystems, Inc., Mountain View, Calif.

[21] Appl. No.: 312,907

[22] Filed: Feb. 21, 1989

[51] Int. Cl.$^5$ .............................................. G02B 6/10
[52] U.S. Cl. .................. 350/96.3; 350/96.29; 350/96.15; 372/6
[58] Field of Search ............... 350/96.15, 96.16, 96.29, 350/96.3, 96.33, 96.34; 372/6, 20, 39

[56] References Cited

U.S. PATENT DOCUMENTS

| | | | |
|---|---|---|---|
| 3,312,905 | 4/1967 | Lewis | 330/4.3 |
| 3,341,787 | 9/1967 | Biard et al. | 331/94.5 |
| 3,456,211 | 7/1969 | Koester | 331/94.5 |
| 3,599,106 | 8/1971 | Snitzer | 331/94.5 |
| 3,646,472 | 2/1972 | Cooper et al. | 331/94.5 |
| 3,729,690 | 4/1973 | Snitzer | 372/6 |
| 4,015,217 | 3/1977 | Snitzer | 372/6 |
| 4,040,890 | 8/1977 | Burrus, Jr. et al. | 372/6 |
| 4,546,476 | 10/1985 | Shaw et al. | 372/6 |
| 4,553,238 | 11/1985 | Shaw et al. | 372/6 |
| 4,730,886 | 3/1988 | Hicks | 350/96.15 |
| 4,815,079 | 3/1989 | Snitzer et al. | 350/96.33 |
| 4,875,215 | 10/1989 | Hughes | 372/6 |

FOREIGN PATENT DOCUMENTS

| | | |
|---|---|---|
| 0138411 | 4/1985 | European Pat. Off. |
| 1015057 | 12/1965 | United Kingdom . |
| 1015431 | 12/1965 | United Kingdom . |
| 1269101 | 4/1972 | United Kingdom . |

*Primary Examiner*—William L. Sikes
*Assistant Examiner*—John Ngo
*Attorney, Agent, or Firm*—Blakely Sokoloff Taylor & Zafman

[57] ABSTRACT

An improved optical fiber is disclosed having particular application for use in a fiber optic communication system. The optical fiber includes an optically transparent core which is doped with a lasing material of the same type used in the diode laser transmitter of the particular communication system. The lasing dopant has the greatest density in the center of the core, and is diffused outward into an optically tranparent cladding surrounding the core which has an index of refraction lower than an index of refraction of the core. The optical fiber is "pumped" such that the lasing dopant within the fiber lases at a desired wavelength and provides gain for the original optical signal provided by the diode laser. The lasing of the dopant material within the fiber results in continuous optical gain along the length of the fiber and avoids the need for repeaters in the fiber optic communication system. Various pumping embodiments are disclosed including coating the outside of the cladding with a light emitting material, such as radium fluorescent paint, and providing a reflector on the outer surface of the fiber to reflect light generated by the radium through the cladding and into the core to achieve lasing. An alternate embodiment is disclosed in which an electroluminescent material coats the outer surface of the cladding, such that upon the application of voltage along the length of the fiber, the electroluminescent material generates photon energy and pumps the dopant within the core to achieve lasing.

21 Claims, 4 Drawing Sheets

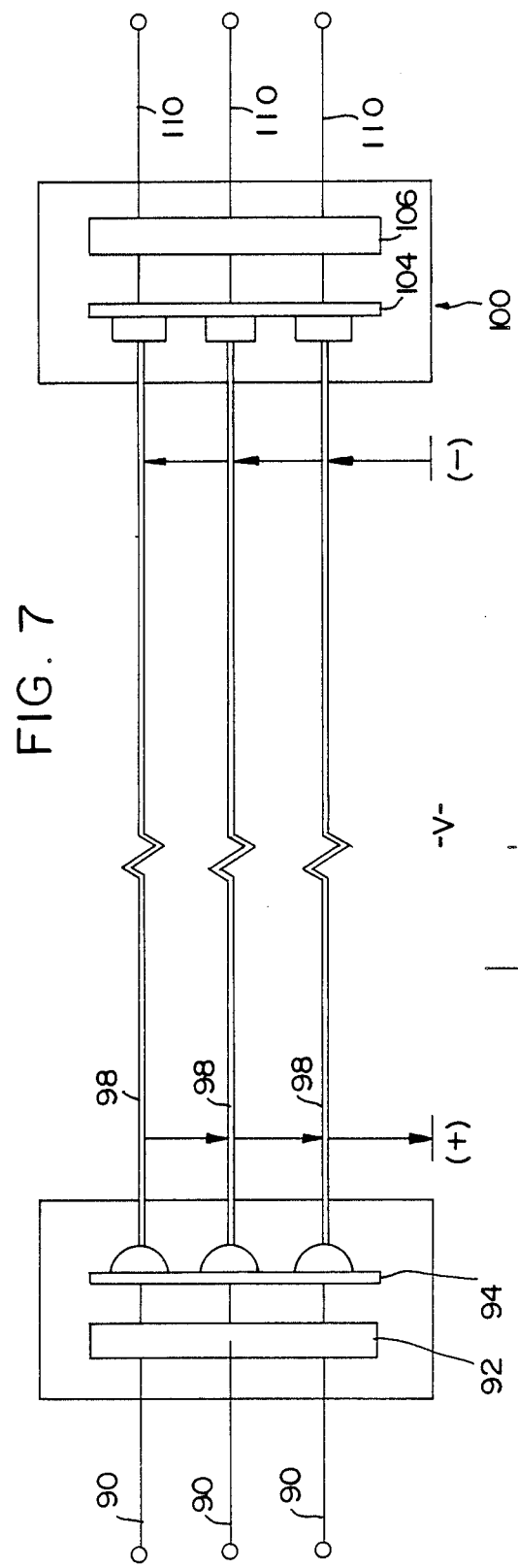
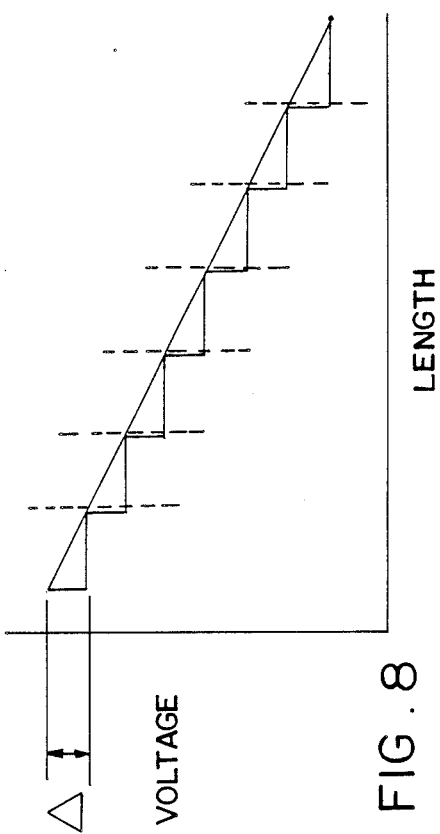

ACTIVE FIBER FOR OPTICAL SIGNAL TRANSMISSION

BACKGROUND OF THE INVENTION

1. Field of the Invention

The present invention relates to the field of optical communication systems, and more particularly, to an improved fiber optic cable suited for use in a long distance optical communication system.

2. Art Background

Since the original invention of the laser, optical communication by laser beam has been one of the principal applications envisioned for this device. Lasers provide light beams having extreme directionality compared to beams produced by other light sources or microwave antennas. In addition, the amount of information which may be transmitted over an electromagnetic wave is proportional to the bandwidth of the wave. Since some lasers operate with very large modulation bandwidths, it is theoretically possible to transmit thousands of color television broadcasts over a single laser beam. Although bandwidth and directionality are two inherent advantages of laser communications systems, a number of disadvantages apply to laser communications. The usefulness of a laser communications system is generally limited by factors such as the necessity of electro-optic detectors, and the ease with which information can be imposed upon the beam itself. Moreover, atmospheric conditions may significantly attenuate the optical radiation of the laser, and laser light does not reflect well or penetrate through objects.

An alternative to atmospheric propagation is the use of optical fibers comprised of glass or plastic to confine and direct the laser beam. The use of optical fibers permits efficient communication within dense population areas and eliminates the complex maze of wires and coaxial cables which have been required for electronic communication.

For long distance communication, a repeater for each channel within a fiber optic bundle is required to correct distortion of the optical signal caused by differential propagation delays, attenuation and noise. However, the use of repeaters interspersed along fiber optic cable segments in a communication system requires that the repeaters be provided with power for their circuits, significantly increases the cost of installation and decreases system reliability. Attenuation, or power loss, in an optical fiber is caused by a variety of processes, and various techniques have been attempted to reduce the attenuation, and therefore the need for repeaters, in a fiber optic communication system. (See: Drexhage, "Infrared Optical Fibers", Scientific American, Nov. 1988, pg. 110; and, O'Shea, "An Introduction to Lasers and Their Applications", Chapter 8, Addison-Wesley, Dec. 1978.)

As will be described, the present invention overcomes the disadvantages associated with prior art fiber optic cables, and discloses a fiber optic cable which eliminates the need for repeaters by effectively lasing the entire cable length. The cable is "pumped" to achieve lasing along its length using one of a variety of pumping mechanisms, as disclosed herein.

SUMMARY OF THE INVENTION

An improved optical fiber is disclosed having particular application for use in a fiber optic communication system. The optical fiber includes an optically transparent core which is doped with a lasing material operating at the same wavelength as the source. Preferably the lasing material is the same type used in the diode laser transmitter of the particular communication system. The lasing dopant has the greatest density in the center of the core, and is diffused outward into an optically transparent cladding surrounding the core which has an index of refraction lower than an index of refraction of the core. The optical fiber is "pumped" such that the lasing dopant within the fiber lases at a desired wavelength and provides gain for the original optical signal provided by the diode laser. The lasing of the dopant material within the fiber results in continuous optical gain along the length of the fiber and avoids the need for repeaters in the fiber optic communication system. Various pumping embodiments are disclosed including coating the outside of the cladding with a light emitting material, such as radium fluorescent paint, and providing a reflector on the outer surface of the fiber to reflect light generated by the radium through the cladding and into the core to to increase the pumping efficiency. An alternate embodiment is disclosed in which an electroluminescent material coats the outer surface of the cladding, such that upon the application of voltage along the length of the fiber, the electroluminescent material generates photon energy and pumps the dopant within the core to achieve lasing. In a preferred embodiment, an insulating layer of glass is provided over the electroluminescent material and separates a reflective layer from the electroluminescent layer. The reflective layer reflects light generated by the electroluminescent layer back through the cladding and into the core to achieve increased pumping efficiency. Over long segments of fiber, to avoid arcing through the insulating layer, the reflective layer is divided into electrically separate longitudinal segments, and the electroluminescent layer is electrically shorted to the reflective segments at various lengths along the fiber to equalize the voltage between the electroluminescent layer and the reflective layer.

As disclosed, the present invention's unique design achieves optical gain along the entire length of the fiber and avoids the need for repeaters, and as such, the present invention is particularly suited for use in underwater, space and other remote environments. In addition, the present invention achieves high reliability in radiation rich environments which could impair or destroy digital electronics within repeater assemblies.

BRIEF DESCRIPTION OF THE DRAWINGS

FIG. 7 is a schematic illustration of a conceptual fiber optic communications system utilizing the teachings of the present invention.

FIG. 8 is a graph illustrating the linear voltage drop along the length of the electro-luminescent layer 78 which is transferred to the reflective layer 82 by shorting the two layers together at one end of each segment.

DETAILED DESCRIPTION OF THE INVENTION

An improved optical fiber is disclosed which has particular application for use in long distance optical communications systems. In the following description for purposes of explanation, numerous details are set forth such as specific wavelengths, angles, materials, etc., in order to provide a thorough understanding of the present invention. However, it will be apparent to one skilled in the art that the invention may be practiced without these specific details. In other instances, well known components, structures and electrical processing means have not been described in detail in order not to obscure the present invention unnecessarily.

Figure 1:
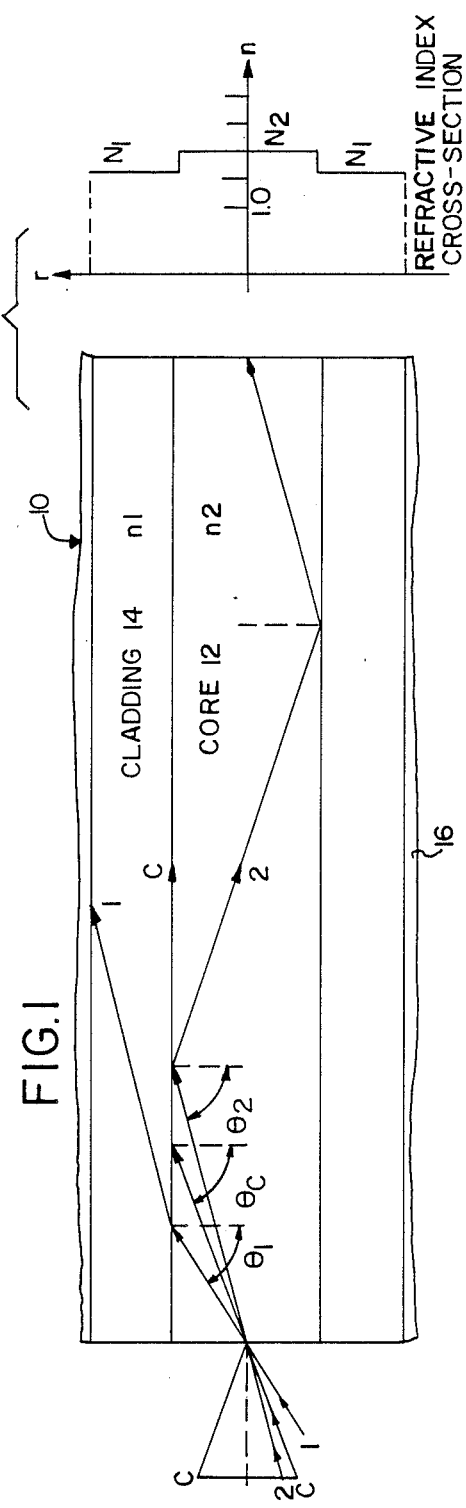
FIG. 1 is a diagrammatical cross section of a typical prior art fiber optic cable.

Referring now to FIG. 1, a common prior art optical fiber is illustrated which acts as an optical wave guide for light waves. The optical fiber, generally denoted by the numeral 10, includes a thin, cylindrical core 12 which is comprised of glass having a refractive index $N_2$. Core 12 is surrounded by another layer of glass referred to as a cladding 14 having a lower refractive index $N_1$ then the core 12. As illustrated, rays of light incident from the core 12 onto the cladding 14 at an angle having a normal greater than $\theta_c = \sin^{-1} N_1/N_2$ are trapped within the core 12 by total internal reflection. Rays of light transmitted into the cladding are absorbed by a jacket 16 which surrounds the cladding 14, and is typically comprised of an opaque plastic. The absorption of light rays by the jacket 14 prevents cross talk with other fibers in a fiber optic bundle. In fibers constructed of a separate core and cladding, rays of light which propagate at larger angles to the optical axis of the fiber require greater propagation time than rays propagating at smaller angles. This effect results in differential delay which may be eliminated by constructing fibers which have an extremely small refractive index difference between the core 12 and cladding 14. As the ratio of $N_1$ over $N_2$ approaches 1, the critical angle (c) approaches 90°, and only a single transverse mode propagates through the cable.

It is known that by properly doping the fiber during the manufacturing process, it is possible to produce a fiber which has a refractive index which decreases parabolically as a function of distance from the optical axis of the fiber. The refractive index gradient results in the optical beam being confined to the core 12 of the fiber 10. Accordingly, despite long distances travelled, the non-paraxial rays arrive at the end of the fiber 10 at the same time as the axial rays passing through the core 12.

Figure 2:
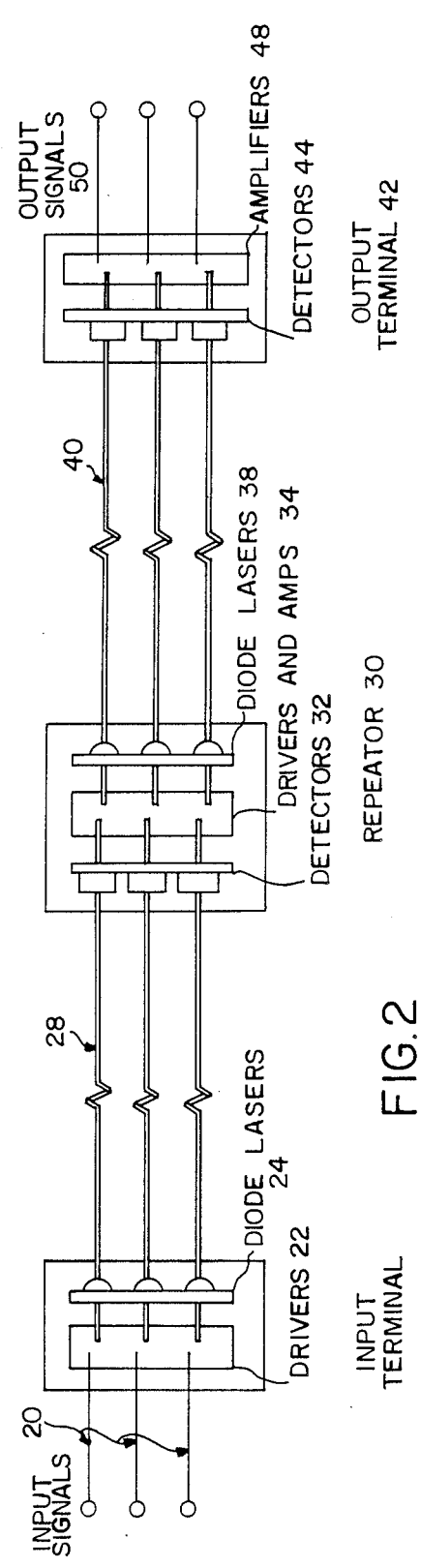
FIG. 2 illustrates a prior art three channel fiber optic communications system employing semi-conductor lasers.

Referring now to FIG. 2, there is shown a common prior art fiber optic communications system. As illustrated, the fiber optic communication system accepts electrical input lines 20 carrying electrical signals, and couples these signals to electrical drivers 22 which drive diode lasers (or light emitting diodes) 24, as is well known. Each of the diode lasers 24 are optically coupled to a fiber optic cable 28 which may run for several kilometers. Due to signal attenuation, or power loss, resulting from a loss of signal from light passing from the core 12 into the cladding 14, as well as light absorbed by atoms of the material comprising the core 12, impurities in the material, and/or density fluctuations within the fiber itself, repeaters must be coupled along lengths of the cable to recondition the signals passing along each fiber. As shown in FIG. 2, each repeater 30 includes photodiode detectors 32 coupled to the end of each optical fiber cable, appropriate electrical drivers and amplifiers 34 to recondition the (now electrical) signal and place it in appropriate digital form matching as closely as possible to the input signals 20, and diode lasers 38 to retransmit the recondition signals along another segment 40 of the fiber optic cable.

The optical receiver at the end of the fiber optic communication system comprises an output terminal 42 having photodetectors 44 for receiving the optical signals travelling along the fiber optic cables 40, along with appropriate conditioners, demultiplexors, and demodulation circuitry generally described as amplifiers 48. The electrical output signals 50 are then coupled to the appropriate digital communication link, as is well known. Each repeater 30 must be provided with some source of power (internally through a battery, or an external power source) o function. Accordingly, it is very difficult to construct fiber optic communications systems in remote locations due to the necessity of each repeater requiring maintenance and electrical power to properly operate. Remote locations would include desolate geographies as well as undersea and space based applications. Moreover, it will be appreciated that the electrical components comprising each repeater 30 are a source of potential failure due to power failures, EMP nuclear bursts or random component failure.

Figure 3:
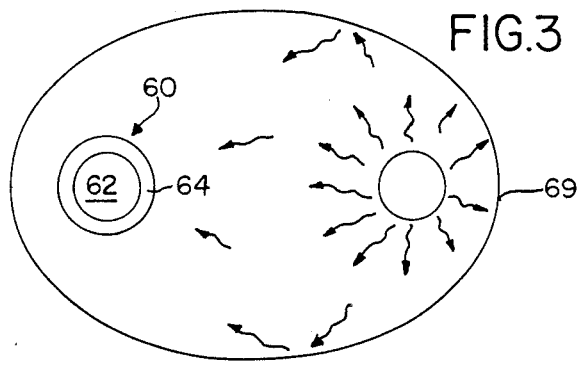
FIG. 3 illustrates an embodiment of the present invention in which an external light source is used to pump a doped fiber cable to achieve lasing.

Referring now to FIG. 3, an embodiment of the present invention is illustrated which includes a fiber optic cable, generally referred to by the numeral 60 having a core 62 and a cladding 64. The glass fiber material comprising the optical fiber 60 is doped with a quantity of the same material used to generate laser light in the diode lasers 24 of the optical communication system of FIG. 2. It is believed that the most advantageous implementation of the present invention is to dope only the inner core 62 and allow the dopant to diffuse into the cladding 64, thereby providing doping density greater in the center of the core 62 than farther out towards the peripheral edges of the optical fiber. Doping in this fashion is believed to compensate for the tendency to have a depletion of excited state material where the optical signal intensity is greatest, and avoid gain saturation in the center of the core 62.

It will be appreciated by one skilled in the art, that by doping optical fiber 60 with the same material used to generate laser light in diode lasers 24, that the effect of pumping the length of fiber 60, and thereby raise the fiber material to an excited energy state, is to lase the dopant material and provide optical gain throughout the length of the fiber. Since the dopant within the fiber 60 is the same dopant as utilized in diode lasers 24, the effect of lasing the dopant within the fiber 60 is to create a laser amplifier for the optical signal while preserving collimation and phase coherence.

The mechanism for pumping the fiber 60 to create the lasing effect may take a variety of forms. As shown in FIG. 3, the pumping may be accomplished by providing a light source 68 within an elliptical reflector 69 surrounding the fiber 60, with the fiber at one locus of the elliptical reflector. This pumping apparatus is similar in construction to that used in the original ruby rod laser wherein the light source 68 provides the optical energy to pump the lasing material doped into the optical fiber 60, to achieve the desired optical gain for the optical wave length used by the diode lasers 24. Although the embodiment illustrated in FIG. 3 would accomplish the desired results, it will be appreciated that the necessity of surrounding the optical fiber 60 and an external light source 68 within the electrical reflector 69 would be quite bulky and unsuited for underground and other limited space applications.

Figure 4:
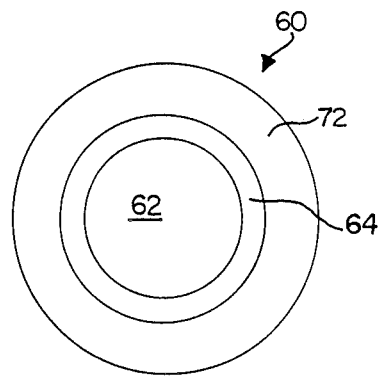
FIG. 4 is a cross section of a fiber optic cable in accordance with the teachings of the present invention in which a light emitting material is used to pump a doped fiber.
Figure 5:
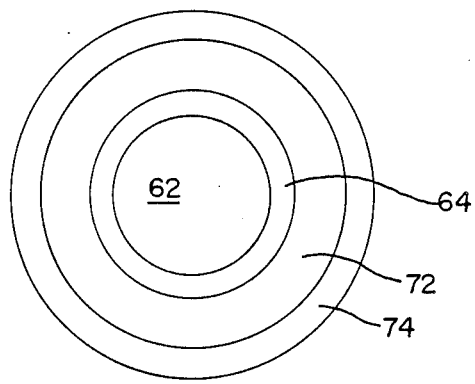
FIG. 5 is a cross section of a fiber optic cable in accordance with the teachings of the present invention further illustrating the use of a reflective coating to increase pumping efficiency.

Referring now to FIG. 4, another embodiment of the present invention is illustrated in which the optical fiber 60 is coated with a light emitting material 72 to provide the energy source required to pump the dopant within the core 62 and cladding 64. An example of a light emitting material which may be utilized is radium fluorescent paint in which the half life of the radium provides a corresponding half life for the achievement of gain through lasing of the dopant within the fiber 60. In order to improve pumping efficiency, a reflective layer 74 may be provided to surround the light emitting material 72 and reflect light back through the cladding 64 and into the core 62 to improve lasing efficiency (see FIG. 5). It will be appreciated, that by coating the fiber 60 with the light emitting material 72, no additional light source is necessary to pump the fiber to achieve the requisite optical gain, and that the fiber of the present invention may be utilized over in long segments without the need for repeaters, since the optical signal originally applied by the diode lasers 24 will be provided with a constant gain along the length of the entire cable 60.

Figure 6:
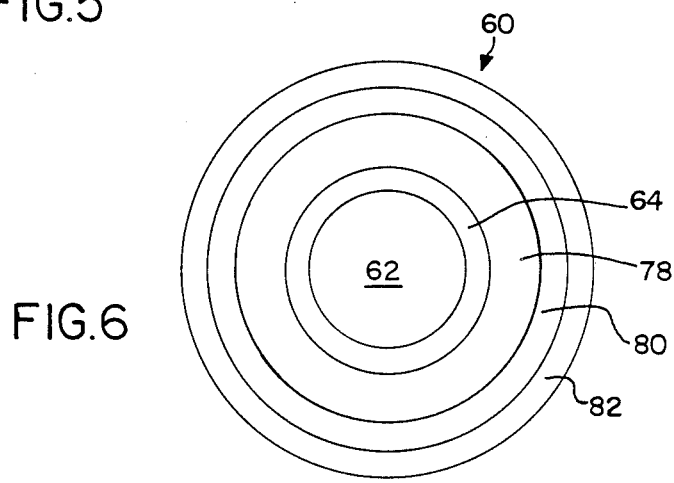
FIG. 6 is a cross section of a fiber optic cable in accordance with the teachings of the present invention in which a doped fiber is pumped by an electroluminescent light source.

Referring now to FIG. 6, a further embodiment of the present invention is illustrated wherein an electroluminescent material 78 surrounds the cladding 64. As shown, an insulating layer 80 surrounds the electroluminescent layer 78 and a reflective layer 82 surrounds the insulating layer 80. The insulating layer 80 may comprise another layer of glass which is optically clear to avoid loss of pumping efficiency, and the reflector may comprise some form of metal (for example, aluminum). The application of a voltage across the length of the fiber 60 results in the electroluminescent layer 78 generating photon energy which is used to pump the dopant within core 62 to achieve the desired lasing. As best illustrated in FIG. 7, the fiber optic communications system utilizing the teachings of the invention disclosed in FIG. 6, includes electrical input signals 90 which are coupled to drivers 92 and diode lasers 94, in a similar fashion as the system disclosed in FIG. 2. Each optical fiber 98 coupled to its respective diode laser has the structure of the invention illustrated in FIG. 6. As in the case of prior art systems, the detector generally denoted by the numeral 100 includes photodetectors 104 and appropriate circuitry 106 to convert incident optical signals traveling along the fibers 98 into appropriate data output signals 110, as is known in the art.

As shown in FIG. 7, applying a voltage V across the length of each optical fiber 98 on the electroluminescent layer 78, results in the generation of photon energy by the electroluminescent layer 78 and the lasing of the core dopant. However, as will be appreciated, there will be a voltage drop along the length of each fiber 98 in the electroluminescent layer 78, and this voltage drop from current flowing along the length of the fiber 98 must be sufficiently low to avoid breakdown of the insulator layer 80 separating the electroluminescent layer 78 from the reflective layer 82. To avoid the breakdown of the insulating layer 80, for long sections of the fiber the reflective layer 82 is shorted to the electroluminescent layer 78 to equalize the voltage drop on both surfaces. Accordingly, fiber 98 must be segmented such that at one end of each segment the reflective layer 82 is shorted to the electroluminescent layer 78. As best shown in FIG. 8, the linear voltage drop along the length of the electroluminescent layer 78 is transferred to the reflective layer 82 by shorting the two layers together at one end of each segment. As shown in FIG. 8, the stepped function indicates the stepped voltage drop for the reflecting reflective layer 82 at each segment.

Figure 9:
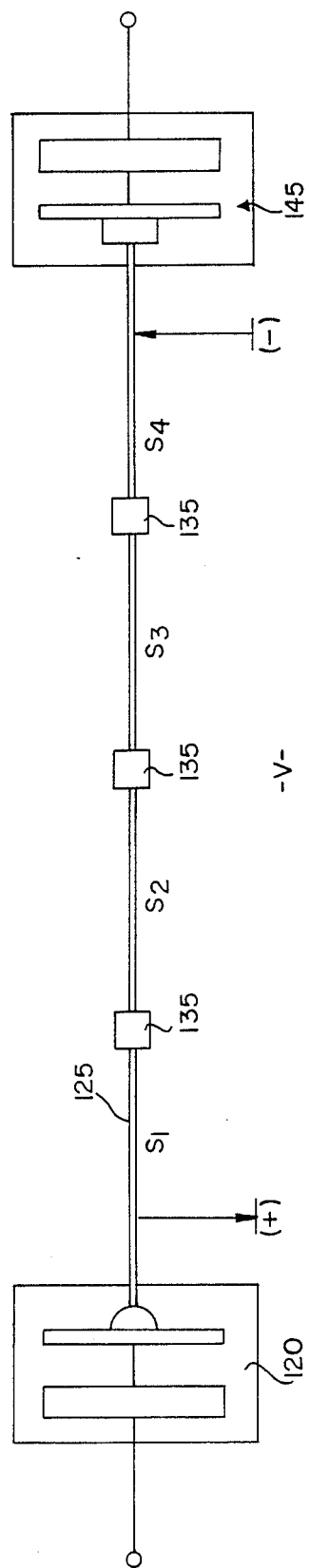
FIG. 9 is a conceptual schematic of a fiber optic communication system in which the optical fiber is broken into segments.

A fiber optic communication system in accordance with the teachings of the invention as illustrated in FIG. 6 is shown in FIG. 9. As illustrated, the transmitter including appropriate drivers and diode lasers as in FIGS. 2 and 7 is identified generally by the numeral 120. The optical fiber 125 having the structure of the fiber illustrated in FIG. 6 is broken into segments S1, S2, S3 and S4, as shown. At one end of each segment is a connector 135. Each of the connectors 135 physically short the electroluminescent layer 78 to the reflective layer 82 of the upstream segment, thereby insuring that the voltage across the insulating layer 80 is identical at that point. As previously described, the application of voltage over the length of fiber 125 results in the lasing of the dopant within core 62 and the requisite optical gain to avoid the need for repeaters spaced along the length of the cable. Detector electronics 145 are provided to receive the transmitted signal along the cable 125 and couple the electrical signal to appropriate digital electronics. It will be appreciated, that the connectors 135 are simple mechanical connectors which are not prone to failure and require no external power for operation. Alternatively, the electroluminescent layer 75 may be shorted to the reflective layer 82 by etching a portion of the reflective layer 82 and insulating layer 80 to expose the electroluminescent layer 75 and plating the etched surface to form the connection between the electroluminescent layer 75 and reflective layer 82.

Thus, an improved optical fiber has been disclosed which obviates the need for repeaters to be spaced along the length of the fiber to correct for signal attenuation. The present invention's use of a doped core 62 and fused dopant in the cladding 64, in conjunction with one of a variety of pumping configurations, results in optical gain along the length of the fiber. Since the technology of the present invention is not dependent upon electrical repeaters, it is highly immune to EMP factors resulting from, for example, nuclear blasts. In addition, since the fiber provides inherent gain through lasing of the dopant in the core, the diode laser may be of lower power.

Although the present invention has been described with reference to FIGS. 1–9, it will be understood that the figures are for illustration only and should not be taken as limitations upon the invention. For example, it is contemplated that with mirrored ends, or a looped end to end segment of the present invention's fiber through a beam splitter, the fiber may form a ring laser which may be useful in airborne applications for inertial navigation. Since the fiber is light in weight, it is believed that a ring laser of this type would be of less weight than a similar ring laser made from mechanical parts and solid glass. In addition, since the laser fiber of the present invention has gain only over a narrow range of wavelength, it may be used as a filter to selectively amplify an narrow range of wavelengths from a broader band transmitting device, such as a light emitting diode. Thus, a low cost wide band transmitter such as a light emitting diode, could be utilized instead of a laser diode transmitter, while still achieving a narrow band signal after passing through a length of the present invention's narrow band amplifying fiber.

I claim:

1. An improved optical fiber for carrying an optical signal comprising:
   an optically transparent core having a first index of refraction, said core being doped with a lasing material such that said core is doped having the greatest concentration of said dopant at the center of said core and said dopant is diffused outward from said center into said cladding:
   an optically transparent cladding surrounding said core having a second index of refraction which is lower than said first index of refraction;
   pumping means spatially disposed parallel to said cladding for providing light through said cladding and into said core, such that said lasing material lases at a desired wavelength and provides continuous gain for said optical signal;
   whereby said optical signal is provided gain by said lasing.

2. An improved optical fiber for carrying an optical signal comprising:
   an optically transparent core having a first index of refraction, said core being doped with a lasing material;
   an optically transparent cladding surrounding said core having a second index of refraction which is lower than said first index of refraction;
   pumping means spatially disposed parallel to said cladding, comprising a light emitting material surrounding said cladding, for providing light through said cladding and into said core such that said lasing material lases at a desired wavelength and provides continuous gain for said optical signal;
   whereby said optical signal is provided gain by said lasing.

3. The improved optical fiber as defined by claim 2, further including a reflective material surrounding said light emitting material such that light emitted from said light emitting material is reflected onto and through said cladding into said core to produce said lasing.

4. The improved optical fiber as defined by claim 3, wherein said light emitting material comprises a fluorescent material mixed with a radioactive material.

5. The improved optical fiber as defined by claim 4, wherein said core and cladding comprise glass.

6. The improved optical fiber as defined by claim 5, wherein said reflective material comprises a metal.

7. The improved optical fiber as defined by claim 2, wherein said light emitting material comprises an electroluminescent or electroflourescent material which emits light of a desired wavelength when electric power is applied.

8. The improved optical fiber as defined by claim 7, further including an optically transparent insulating material surrounding said electroluminescent or electroflourescent material.

9. The improved optical fiber as defined by claim 8, further including a reflective material surrounding said insulating material such that any portion of said light emitted from said electroluminescent material passing through said insulating material is reflected back through said insulating material, through said cladding and into said core.

10. The improved optical fiber as defined by claim 9, wherein said insulating material is glass.

11. The improved optical fiber as defined by claim 10, wherein said optical fiber is segmented such that at predetermined lengths of said fiber said reflective material is coupled to said electroluminescent material to equalize the voltage between said reflective and electroluminescent materials.

12. An improved data transmission system for transmitting an optical signal, comprising:
    laser light generation means for generating laser light having a predetermined wavelength, and comprising said optical signal;
    an optical fiber having a first and second end, said first end coupled to said laser light generation means, said optical fiber comprising:
      an optically transparent core having a first index of refraction, said core being doped with a lasing material;
      an optically transparent cladding surrounding said core having a second index of refraction which is lower than said first index of refraction;
      pumping means spatially disposed parallel to said cladding and surrounding said cladding for providing light through said cladding and into said core such that said lasing material laser at the same wavelength as said laser light generated by said laser light generation means and provides continuous gain for said optical signal;
    receiving means coupled to said second end of said fiber for receiving said optical signal;
    whereby said optical signal is provided gain by the lasing of said lasing material.

13. The improved data transmission system as defined by claim 12, wherein said pumping means comprises a radioactively-powered light emitting material.

14. The improved data transmission system as defined by claim 13, wherein said radioactive material comprises radium.

15. The improved data transmission system as defined by claim 13, further including a reflective material surrounding said radioactive material such that a portion of said light emitted from said radioactive material is reflected through said cladding and onto said core.

16. The improved data transmission system as defined by claim 12, wherein said pumping means comprises an electroluminescent or electroflourescent material surrounding said cladding, said electroluminescent material emitting light of a desired wavelength when electric power is applied to said material.

17. The improved data transmission system as defined by claim 16, wherein electric power is applied to said electroluminescent material by applying electrodes having opposite polarity at to each end of said fiber and applying a voltage across said electrodes.

18. The improved data transmission system as defined by claim 17, further including a transparent insulating material surrounding said electroluminescent material.

19. The improved data transmission system as defined by claim 18, further including a reflective material surrounding said insulating material such that light passing through said insulating material is reflected from said reflective material through said cladding and into said core.

20. The improved data transmission system as defined by claim 19, wherein said reflective material comprises a conductive material.

21. The improved data transmission system as defined by claim 20, wherein said fiber is segmented such that at predetermined lengths of said fiber said reflective material is coupled to said electroluminescent material to equalize the voltage between said electroluminescent material and said reflective material.

* * * * *